United States Patent [19]

Chen et al.

[11] Patent Number: 5,751,791
[45] Date of Patent: May 12, 1998

[54] NETWORK BASED MULTIMEDIA MESSAGING METHOD AND SYSTEM

[75] Inventors: Mon-Mei Chen, Marlboro; Howard Paul Katseff, Manalapan; Ashok K. Kuthyar, Holmdel; Robert Edward Markowitz, Glen Rock; Robert F. Mortenson, Chatham; Ram S. Ramamurthy, Manalapan; Bethany Scott Robinson, Colts Neck; Peter H. Stuntebeck, Little Silver, all of N.J.

[73] Assignee: AT&T Corp, Middletown, N.J.

[21] Appl. No.: 792,339

[22] Filed: Jan. 31, 1997

Related U.S. Application Data

[63] Continuation of Ser. No. 357,473, Dec. 16, 1994, abandoned.

[51] Int. Cl.⁶ ..................................... H04M 1/64
[52] U.S. Cl. .................. 379/88; 379/142; 379/93.01; 348/14
[58] Field of Search .................. 379/67, 69, 70, 379/74, 77, 93, 96, 100, 120, 127, 142, 201, 207, 213, 214, 243, 244, 245, 53, 100.08, 90.01, 93.01; 348/6, 7, 9, 13, 14; 358/402, 403; 395/200; 370/355, 357

[56] References Cited

U.S. PATENT DOCUMENTS

| | | | |
|---|---|---|---|
| 4,837,798 | 6/1989 | Cohen et al. | 379/88 |
| 4,932,042 | 6/1990 | Elliott et al. | 379/67 |
| 5,003,577 | 3/1991 | Douglas et al. | 379/89 |
| 5,008,926 | 4/1991 | Misholi | 379/89 |
| 5,192,999 | 3/1993 | Grazyck et al. | 358/85 |
| 5,193,110 | 3/1993 | Jones et al. | 379/94 |
| 5,200,993 | 4/1993 | Wheeler et al. | 379/96 |
| 5,265,205 | 11/1993 | Schroder | 395/200 |
| 5,315,633 | 5/1994 | Champa | 348/16 |
| 5,333,266 | 7/1994 | Boaz et al. | 395/200 |
| 5,335,276 | 8/1994 | Thompson et al. | 380/21 |
| 5,345,258 | 9/1994 | Matsubara et al. | 348/14 |
| 5,351,276 | 9/1994 | Doll, Jr. et al. | 379/67 |
| 5,384,835 | 1/1995 | Wheeler et al. | 379/96 |
| 5,394,445 | 2/1995 | Ball et al. | 379/67 |
| 5,406,557 | 4/1995 | Baudoin | 379/94 X |
| 5,467,390 | 11/1995 | Brankley et al. | 379/229 |

(List continued on next page.)

FOREIGN PATENT DOCUMENTS

| | | | |
|---|---|---|---|
| 0548597 | 6/1993 | European Pat. Off. | |
| 63-127645 | 5/1988 | Japan | 379/53 |
| 1-132261 | 5/1989 | Japan | 379/53 |
| 3-140052 | 6/1991 | Japan | 379/53 |
| 4-109742 | 4/1992 | Japan | 379/53 |
| 2282506 | 4/1995 | United Kingdom. | |

OTHER PUBLICATIONS

Andrew W. Davis, "Vistium: AT&T's Board–Level Videoconferencing at the Desktop", Advanced Imaging, Sep. 1994, p. 46.

Don Labriola, "Meeting on the Edge", Windows Sources, Sep. 1994, p. 96.

Andrew W. Davis, Desktop Videoconferencing and Imaging: Is There Really an H.32o vs. Indeo Conferencing Compression War?, Advanced Imaging, Sep. 1994, p. 36.

Ned Freed, "Multimedia Mail", LAN Magazine, vol. 9, No. 5, May 1994, p. 29.

"Network Capabilities in Support of Multimedia Applications", G.D. Flinchbaugh et al., IEEE, pp. 308.7.1 to 308.7.5 Feb. 1990.

*Primary Examiner*—Krista Zele
*Assistant Examiner*—Scott L. Weaver
*Attorney, Agent, or Firm*—Stephen M. Gurey

[57] ABSTRACT

A method and system is disclosed for handling multimedia messages when the intended recipient is unavailable. The telecommunication based method and system allows a party to leave a greeting message which will be furnished to a caller when the party is unavailable. The method and system further allows a caller to leave a multimedia message for the unavailable intended recipient. The method and system further alerts the party that a multimedia message has been recorded and allows the party to retrieve the multimedia message.

34 Claims, 4 Drawing Sheets

U.S. PATENT DOCUMENTS

| | | | |
|---|---|---|---|
| 5,473,363 | 12/1995 | Ng et al. | 348/15 |
| 5,473,366 | 12/1995 | Imaeda et al. | 348/14 |
| 5,497,373 | 3/1996 | Hulen et al. | 379/399 Z |
| 5,499,289 | 3/1996 | Bruno et al. | 379/220 |
| 5,524,137 | 6/1996 | Rhee | 379/67 |
| 5,530,740 | 6/1996 | Irrabarren et al. | 379/89 |
| 5,533,108 | 7/1996 | Harris et al. | 348/15 |
| 5,550,982 | 8/1996 | Long et al. | 395/200.49 |
| 5,555,017 | 9/1996 | Landante et al. | 348/15 |
| 5,557,667 | 9/1996 | Bruno et al. | 379/201 |
| 5,559,868 | 9/1996 | Blonder | 379/96 |
| 5,563,882 | 10/1996 | Bruno et al. | 379/202 |
| 5,563,937 | 10/1996 | Bruno et al. | 379/201 |
| 5,592,478 | 1/1997 | Weiss | 379/202 |
| 5,617,539 | 4/1997 | Ludwig et al. | 395/200.35 |
| 5,625,407 | 4/1997 | Biggs et al. | 348/16 |
| 5,631,904 | 5/1997 | Fitser et al. | 379/93.03 |

NETWORK BASED MULTIMEDIA MESSAGING METHOD AND SYSTEM

This is a continuation of application Ser. No. 08/357,473, filed on Dec. 16, 1994, now abandoned.

FIELD OF THE INVENTION

This invention relates to a method and system for Network Based Multimedia Messaging and, more particularly, to a method and system for handling multimedia messages when the intended recipient is unavailable.

BACKGROUND OF THE INVENTION

Multimedia communication is the wave of the future. The power of multimedia communication is evident from the expansion in "videoconferencing", in which a user at a videoconferencing station may have a "face-to-face" communication in real time with someone at another videoconferencing station, although they may be separated by vast distances. The introduction of desktop videoconferencing equipment is making multimedia communication even more prevalent. Generally, multimedia communication uses equipment incorporated as part of a general purpose computer, for example, the Vistium board set sold by AT&T, or integrated systems specifically designed for the task. A more detailed general background on multimedia communication, and particularly, desktop videoconferencing and equipment may be found in Don Labriola, *Meeting on the Edge*, Windows Sources, Sept. 1994, at pg. 96.

While real-time communications are made possible with these technologies, certain problems still exist. A person using a multimedia communication device or station calling another remote multimedia communication station almost exclusively encounters one of two scenarios. Either a) the call is answered, in which case the communication may proceed, or b) the call goes unanswered. While the call may go unanswered because: the called party may have their multimedia communication station turned off thereby being unable to answer the call, the called party may be busy communicating with another party, i.e. a different call, the called party may be away from the equipment or out of town and therefore, not physically able to answer the call, or 3) the person may not wish to answer the call and just lets the phone ring, the problem is the same, namely the caller cannot complete the call.

Of course a possible solution to the problem is that the caller can hang up, and place a new call at a later time, but this may be inconvenient and, in any event, there is no guarantee that the caller will not face the same problem at that time. Another alternative is that the caller could call the party's voice messaging system. However, doing so requires an extra step and the video and data aspects are lost.

Although some electronic mail (e-mail) systems allow the sender to attach a brief video clip to an electronic mail message, this alternative is still a problem because it requires compatible video equipment and e-mail programs/software. It is well known that digitized video information takes up a considerable amount of data storage space in a storage device, for example, a computer memory. Accordingly, large local message storage capability is required at the sending end, where the message is created, and at the receiving end where the message will be replayed. If there is insufficient storage space at the receiving end the recipient may only be able to access a portion of the message or possibly not access the message at all. Additionally, using the e-mail alternative is disadvantageously time consuming and cumbersome because the caller must create the video clip, create an e-mail message, attach the video clip to the e-mail message and then send the message.

Thus, there remains a need in the art of multimedia communication for a solution to the problem created by the caller whose multimedia call goes unanswered by the intended recipient of the message.

SUMMARY OF THE INVENTION

In accord with the invention, we have realized a method and system for network based multimedia messaging which utilizes a switched telecommunication network and its paths, alone or in combination with a wired or wireless broadcast network path, for example, a cable television cable or by satellite. The invention provides for the handling of a call from a caller who, using a multimedia device, will furnish a multimedia message to a recipient by placing a call to the recipient and having the call go unanswered. With one feature of the invention, the method and system involves connecting the unanswered call to a network based multimedia server and recording a multimedia message from the caller using the network based multimedia server. With another feature of the invention, the recipient is informed of or alerted to the caller's recorded multimedia message. Still another feature allows a party to record a multimedia greeting message associated by the telecommunications network with the party's telephone number, which may be played for the caller by the network based multimedia server when the call goes unanswered.

Other features will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference designations denote like objects.

DETAILED DESCRIPTION OF THE INVENTION

Figure 1:
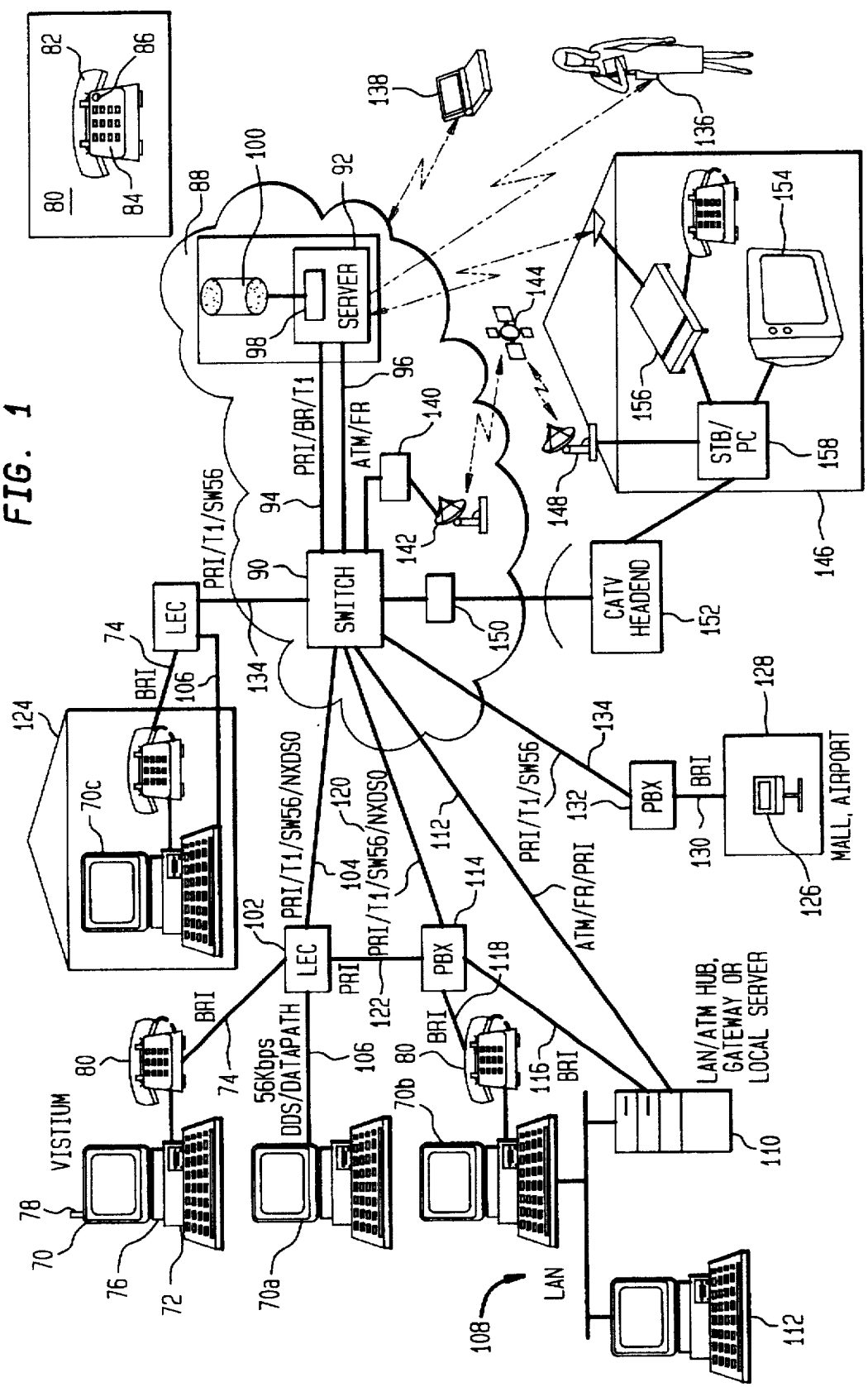
FIG. 1 shows a simplified telecommunication network in accord with an embodiment of the present invention.

FIG. 1 shows a simplified telecommunication network in accord with an embodiment of the present invention. It will be recognized that the network of FIG. 1 includes other known elements, but those elements have been omitted for simplicity in that they are not required for an understanding of the invention disclosed herein.

A caller, using a multimedia communication device or station which is preferably H.320 protocol compliant, will furnish a multimedia message to a recipient with a multimedia communication device or station, which is also preferably H.320 protocol compliant, by placing a call to the recipient. The multimedia message includes, for example, the myriad of combinations of voice, video, datafiles, graphics, whiteboards and shared applications. The caller is equipped with a multimedia device or station 70 which, for example, includes a processing unit 72 coupled to a communication line 74, a CRT or computer viewing screen 76 upon which a multimedia message may be viewed and a camera 78. The multimedia station 70 may additionally include an associated telephone 80 located external to the processing unit 72 to facilitate dialing when the processing unit 72 is incapable of doing so directly. As will be explained below in greater detail, where an external telephone 80 is used, in addition to the usual handset 82 and dialing pad 84, the telephone 80 may also include a message indicator 86 which is used to alert a person at that phone that a message has been received and is pending. The processing unit 72 may be a general purpose computer with multimedia capable equipment incorporated therein or a multimedia specific device or station. In a preferred embodiment, the multimedia communication device is the Vistium video system which is sold by AT&T Corp. The Vistium video system is a board set which allows a conventional personal computer (PC) to perform video and ISDN communications and is H.320 compliant. The construction and operation of the Vistium video system is extensively described in Andrew W. Davis, *VISTIUM: AT&T's Board-Level Videoconferencing at the Desktop*, Advanced Imaging, Sept. 1994 at Pg. 46 which is incorporated herein by reference.

The multimedia device will be connected to the telecommunication network 88 by a communication path which connects a multimedia station and the telecommunication network. The communication path may be comprised of sub-paths which are themselves capable of supporting the transfer of multimedia messages. For example, the communication path between the network and a multimedia station may be from the multimedia station 70 over an ISDN BRI path 74 (sometimes referred to as BRI) to a Local Exchange Carrier (LEC) 102 and then over an ISDN PRI (sometimes referred to as PRI), T1.5 (sometimes referred to as T1) or switched 56 (sometimes referred to as SW56) path 104 between the LEC 102 and the network 88. Alternatively, the path between a multimedia station 70a and the LEC 102 may include a 56 Kbps DDS/Datapath 106.

In another embodiment, a multimedia device 70b may be part of a local area network (LAN) 108 which also includes a LAN server 110 as well as other multimedia devices and non-multimedia computers 112, only one of which is shown. Where the multimedia device 70b is part of a LAN 108, the communication path may advantageously include a path which directly connects the network based server 92 to a LAN/ATM Hub, gateway or local server 110 over, for example, an ATM or frame relay (FR) path 112 or to a PBX 114 over a BRI path 116. Conveniently, the direct connection communication path from the network to the LAN/ATM Hub, gateway or local server 110 allows additional versatility by, for example, providing an alternative connection for the LAN server 110 thereby allowing the network based server 92 to leave an "alert" pending on the LAN server 110 so that as soon as the user signs on to the LAN, they are alerted to the pending message.

In still another embodiment, the connection may be by a BRI path 118 to a PBX 114 and by a PRI, T1, SW56 or nxDS-0 path 120 between the PBX 114 and the telecommunication network 88.

In yet another embodiment, the PBX 114 may be connected over a PRI path 122 to a LEC 102 which is connected to the network 88 by a PRI, T1 or SW56 path 104.

The invention has the further convenient advantage that it is not confined to a multimedia device located in a home or office 124. A pay multimedia device 126 may be constructed and located in a publicly accessible area, for example, near pay telephones at a mall, airport or hotel 128. As shown, the pay multimedia device 126 is connected by a BRI path 130 to a PBX 132 which is in turn connected to the network 88 by a PRI, T1 or SW56 path 134. In a related manner, a transportable wireless device 136, for example, a laptop computer 138, pager or cellular telephone, may be carried by a party and employed to receive an alert, from the network based server 92, for a recorded multimedia message. Additionally, the wireless device 136 may be further equipped to receive an audio portion of the message or the entire multimedia message when, for example, a multimedia capable laptop computer or other multimedia capable reception device is used.

The telecommunication network 88 includes a switch 90 to which the illustrated multimedia stations 70, 70a, 70b, 70c can be coupled and a network based multimedia capable server 92. The switch 90 is coupled by, for example, a PRI, BRI, T1 path 94 or an ATM or FR path 96 to the network based multimedia server 92. The multimedia server 92 includes a processor 98, for example a microprocessor. The multimedia server 92 is coupled to a storage device or memory 100, for example, a hard disk or other electronic, electromagnetic or optical rewriteable storage device, which is used for storing a multimedia message. In an ISDN system using Px64 data compression (128 Kbits/sec) an hour long multimedia message (video/audio/data) occupies approximately 60 Megabytes of storage space. Accordingly, the memory 100 associated with the server 92 should be sized according to the particular data compression method used. Furthermore, while the server and memory is shown and described as a unitary device, the "server" may actually be a plurality of co- or sub-servers which access a unitary remote memory or a plurality of memories associated with groups of servers or each individual server. The processor 98 is configured to accept incoming multimedia data representing the multimedia message or multimedia greeting message and store it in the memory 100. The processor 98 is also configured to retrieve the stored multimedia data from the memory 100 and furnish it at a later time. The switch 90 is preferably constructed to comply with CCITT recommendations I.250 et seq. and, more particularly, as set forth in *CCITT Integrated Services Digital Network (ISDN) General Structure and Service Capabilities*, Call Forwarding Busy, Recommendation I.252.2 (1992) and *Integrated Services Digital Network (ISDN) General Structure and Service Capabilities*, Call Forwarding No Reply, Recommendation I.252.3 (1992), both published by the ITU and incorporated herein by reference, or a network equipment arrangement providing the functionality of forwarding an unanswered call to an alternate number. The implementation of recommendations I.252.2 and I.252.3 allows the generation of a signal by the ISDN telecommunications network switch which indicates that the call is an unanswered call. The switch will thereafter, in response to the signal, connect the call to another telephone number which, as used herein, corresponds to the telephone number of the network based multimedia server 92. The preferred switch 90 is of the No. 5ESS™ (electronic switching system) design of the "generic 6" level of implementation which incorporates CCITT recommendations I.252.2 (Call Forwarding Busy (CFB)) and I.252.3 (Call Forwarding No Reply (CFNR)). The general architecture of the No. 5ESS™ design is extensively described in the series of articles published in the AT&T Technical Journal, Volume 64, No. 6, part 2, pp. 1305-1564, July/Aug., 1985 which is incorporated herein by reference.

In another embodiment, the telecommunication network 88 may include additional processing equipment 140 following the switch 90 which will configure an outgoing multimedia message for a message path which includes a satellite transmitter 142 so that the server 92 can furnish the multimedia message via satellite 144 to a home 146 equipped with a satellite receiver 148. In still another embodiment, the telecommunication network 88 may include processing equipment 150 to configure an outgoing multimedia message for a path which includes a cable television headend 152 for ultimate provision to a home 146 where the message can be viewed on a television set 154. In a still further embodiment, the path may include a switched voice/digital (SVD) or other wired or wireless multimedia capable modem 156. Where cable 152, satellite 148 or a modem 156 is used, additional processing equipment 158, for example, a cable converter, satellite transmission converter or personal computer may be necessary to access a message or further process a message before it can be viewed.

Regarding the paths described herein, it will be recognized that types or combinations of paths other than those described herein will work provided the path is capable of supporting a combination of single or two channel video, audio or data. By way of example, where the path is an ISDN path it should support about 64 kilobits per second access for combinations of single channel video, audio and data or about 128 kilobits per second access for combinations of two channel video, audio and data. Where the path is switched 56 it should support about 56 kilobits per second access for combinations of single channel video, audio and data or about 112 kilobits per second access for combinations of two channel video, audio and data. Where the path is nxDS-0, the path should support nx64 kilobits per second access, where n is the number of channels.

It will be further recognized that video compression technology, communication protocols and existing bandwith limitations set the limits for the types of paths which may be used. It is therefore contemplated that advances in, for example, video compression technology may alter, supplement or supplant the particular path implementations of the above without departing from the invention. A discussion illustrating emerging video compression methods and technology may be found in Andrew W. Davis, *Desktop Videoconferencing and Imaging: Is There Really an H.320 vs. Indeo Conferencing Compression War?*, Advanced Imaging, Sept. 1994, at Pg. 36.

Figure 2:
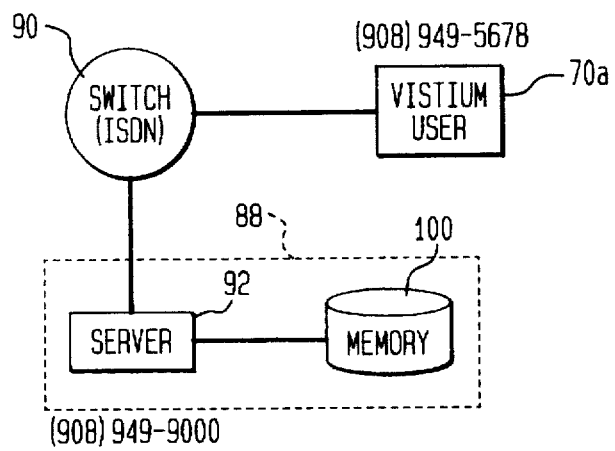
FIG. 2 shows the process of leaving a multimedia greeting message using a simplified portion of the telecommunication network of FIG. 1.

Referring now to FIG. 2 which shows, by way of illustrative example, the preferred process of leaving a multimedia greeting message using a simplified portion of the telecommunication network of FIG. 1 over ISDN paths. A party at a multimedia device or station 70a, illustrated herein as a Vistium system, who is identifiable by the associated telphone number 908-949-5678, wishes to leave a multimedia greeting message for callers, because the party will be away for the next three weeks. The party directly calls the network based multimedia server 92 which is shown as identifiable by the associated telephone number 908-949-9000. A switch 90, located in the telecommunication network 88 of FIG. 1, connects the call to the network based multimedia server 92 which answers the call. In the preferred embodiment, upon answering the call, the server 92 checks the information in the calling line identification (CLI), which is available from the network, to determine whether the caller called the server directly (the "originally called number" in the CLI is the server telephone number) or called another telephone number and was connected to the server by the switch (the "originally called number" in the CLI is the called telephone number).

Based upon the CLI, the server 92 presents the party with a plurality of options, for example, record a greeting message, record a message, play messages, delete messages, retrieve messages. In the preferred embodiment however, before the options are presented, the server 92 requests that the party supply some personal identification information for security/fraud prevention, for example, their multimedia station identification or home telephone number (thus allowing remote access), a PIN number or voiceprint. Upon receipt of a proper identification, the party will be presented with the plurality of options.

The party may then create a multimedia greeting message using their multimedia device. The recorded greeting message will thereafter be furnished to the caller by the server when a call to the party is unanswered unless the greeting is subsequently deleted or changed by the party. The multimedia greeting message is associated with the party's telephone number and stored in a memory 100 associated with the server 92 when the party hangs up.

Figure 3:
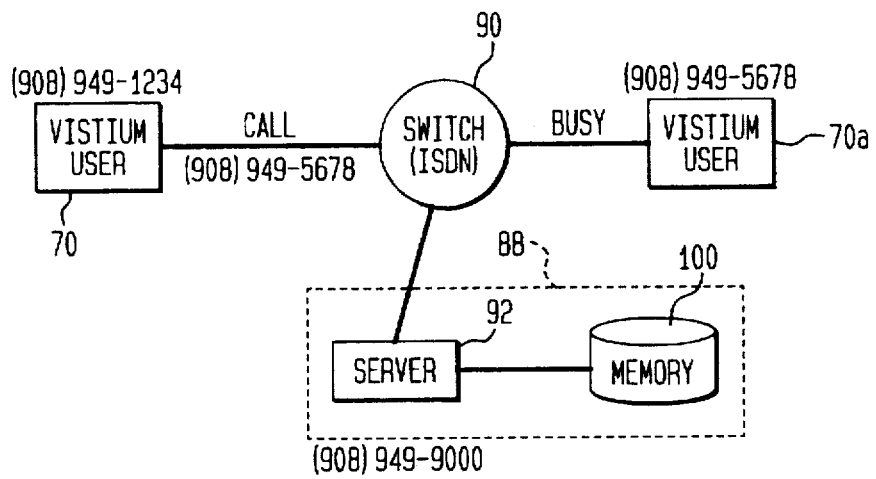
FIG. 3 shows the process of leaving a multimedia message using a simplified portion of the telecommunication network of FIG. 1.

Referring now to FIG. 3 which shows by way of illustration the process of leaving a multimedia message using a simplified portion of the telecommunication network of FIG. 1. As with FIG. 2, the paths are ISDN.

A caller with a Vistium multimedia station 70, associated with the telephone number 908-949-1234, calls a recipient in order to furnish a multimedia message to that recipient (in this example, the intended recipient is the party from FIG. 2). The caller dials the number "908-949-5678" but the line is busy because the party is on a multimedia conference call. By virtue of the implementation of CCITT recommendation I.252.2, the switch 90 determines that the call is unanswered and connects the call to the network based multimedia server 92 of FIG. 2. The server 92 answers the call, checks the CLI and based upon the called number recognizes the call as "leaving a message." The server 92 furnishes the caller with a visual or multimedia greeting message which may be a system supplied message, where no prerecorded multimedia greeting message exists for the dialed number, or as with FIG. 2, plays the multimedia greeting message left by the party. After providing the greeting message to the caller, the server 92 begins recording the caller's multimedia message. The server associates and stores the message and "for" 908-949-5678 "from" 908-949-1234 in the memory 100 or alternatively the server 92 associates and stores the CLI with the message. When the caller has completed the message the caller hangs up, thereby terminating the call.

In an alternative preferred embodiment, an informing, alerting or notification feature is provided. With this feature, the server 92 waits a preselected period of time and initiates a call to the called party using the stored calling party or CLI information to inform the party that a multimedia message has been received and is stored in the memory 100 associated with the server 92. If the alerting does not go through, a feature may be straightforwardly implemented so that the server 92 will again wait a preselected period of time and try alerting the party again, repeating the process until a proper alert is made. In a still further embodiment, the alerting may continue until the party "acknowledges" the alert by, for example, answering an alert phone call or connecting to the server. Alternatively, the server 92 may be configured to alert the party by calling the party's voice messaging service, for example AT&T's AUDIX, and leave a voice message indicating that a multimedia message has been recorded.

In alternative embodiments, the alerting feature may further include setting a message indicator 86 on a telephone 80 as shown and described in connection with FIG. 1 or on the cable or satellite processing equipment 158 of FIG. 1. In still other embodiments, the alerting feature may be accomplished by, for example, e-mail, voice mail, setting an indicator in the LAN server which will bring up an alerting icon or message on a connected CRT screen. In still further embodiments, message alerting may be accomplished using a transportable wireless device 136, for example, a pager, a cellular telephone or a computer with a wireless multimedia capable modem. It will be recognized that the wireless device may receive a portion of the message (i.e. the audio portion) or, in the case of a wireless multimedia capable device such as a multimedia capable wireless modem connected to a laptop computer or a multimedia capable portable telephone, the unified multimedia message.

It will be recognized in connection with FIG. 3 that if the called party was not in, the processing would be the same except the switch would receive a CFNR signal when the call had gone unanswered after a predetermined number of rings.

While it is preferred that the server use CLI received from the telecommunication network, if the telecommunication network is incapable of providing CLI, a convenient alternative implementation can be achieved by establishing at least two dedicated telephone numbers for the server with the first being the directly dialed server telephone number a party seeking purely to retrieve messages would call and the second being a server telephone number that a caller is forwarded to solely for the purpose of leaving a message.

Advantageously, if the telecommunication network switch does not comply with CCITT recommendations I.252.2 and I.252.3 or a have a similar functionality, a still further convenient alternative embodiment uses the communication application running in the caller's multimedia communication device or station to hang up after a busy signal or a preselected number of rings and then automatically dial the network based server. In this embodiment, once connected to the server, the call would then proceed as described herein.

Figure 4:
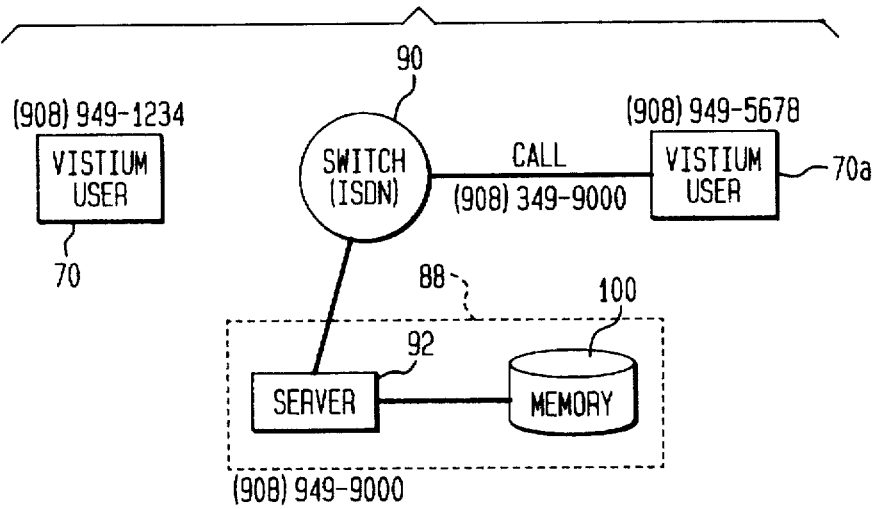
FIG. 4 shows the process of retrieving the multimedia message left in connection with FIG. 3.

Referring now to FIG. 4. which is the same as FIG. 2 except a message and greeting are stored in the memory 100. After a period of time, the party who was the intended recipient of the message discussed in connection with FIG. 3 returns and is alerted that a message is pending. Alternatively, the party could be at a remote location and receive an alert via a wireless device 136 or the party could be at a remote location, for example, at a hotel with an accessable multimedia station 126 and decides to "call in" for any messages since it was not possible for the party to receive a message alert. The party connects to the server as in FIG. 2 to retrieve the pending message. After supplying the appropriate information the party selects the "play messages" option. The party will be furnished with, in the preferred embodiment, a list of all multimedia messages available for playback, with the most recent call listed first, and information which identifies the caller by, for example, their telephone number which was obtained from the CLI or their name. The party then has the option to select the particular message and have it played back. Upon selecting a message, the server 92 furnishes the message to the party. When the message has completed playing, the party may be returned to the selection menu or have the call terminated. If, at any time, the party hangs up or the call is disconnected, the message is retained by the server.

In a further embodiment, where the party is at a remote location and wishes to check messages but does not have access to a multimedia station, the caller may still connect to the server with a device which is only capable of receiving an audio portion of the message. The telecommunication network will determine that the call is "voice only" and discriminate between an audio portion and a video/data portion (which includes non-audio aspects of the message) and furnish only the audio portion of any message(s) not previously retrieved. The party will still have the option of deleting the message. If the message is not deleted, the entire stored message (i.e. the audio portion and video/data portion) will still remain stored thereby preserving the video and data aspects until the party can call in from a multimedia station.

In still further embodiments, the server 92 is capable of converting the stored message from one format to another so that, for example, differences in formats or protocols between the calling and receiving end can be accomodated (e.g. video formats, audio formats, data formats and communication formats or protocols).

While the invention has been described in connection with a pair of multimedia stations, where the receiving location is, for example, cable 152, satellite 148 or a modem 156, where necessary, the message will be accessed using the additional processing equipment 158 discussed above in connection with FIG. 1.

Figure 5A:
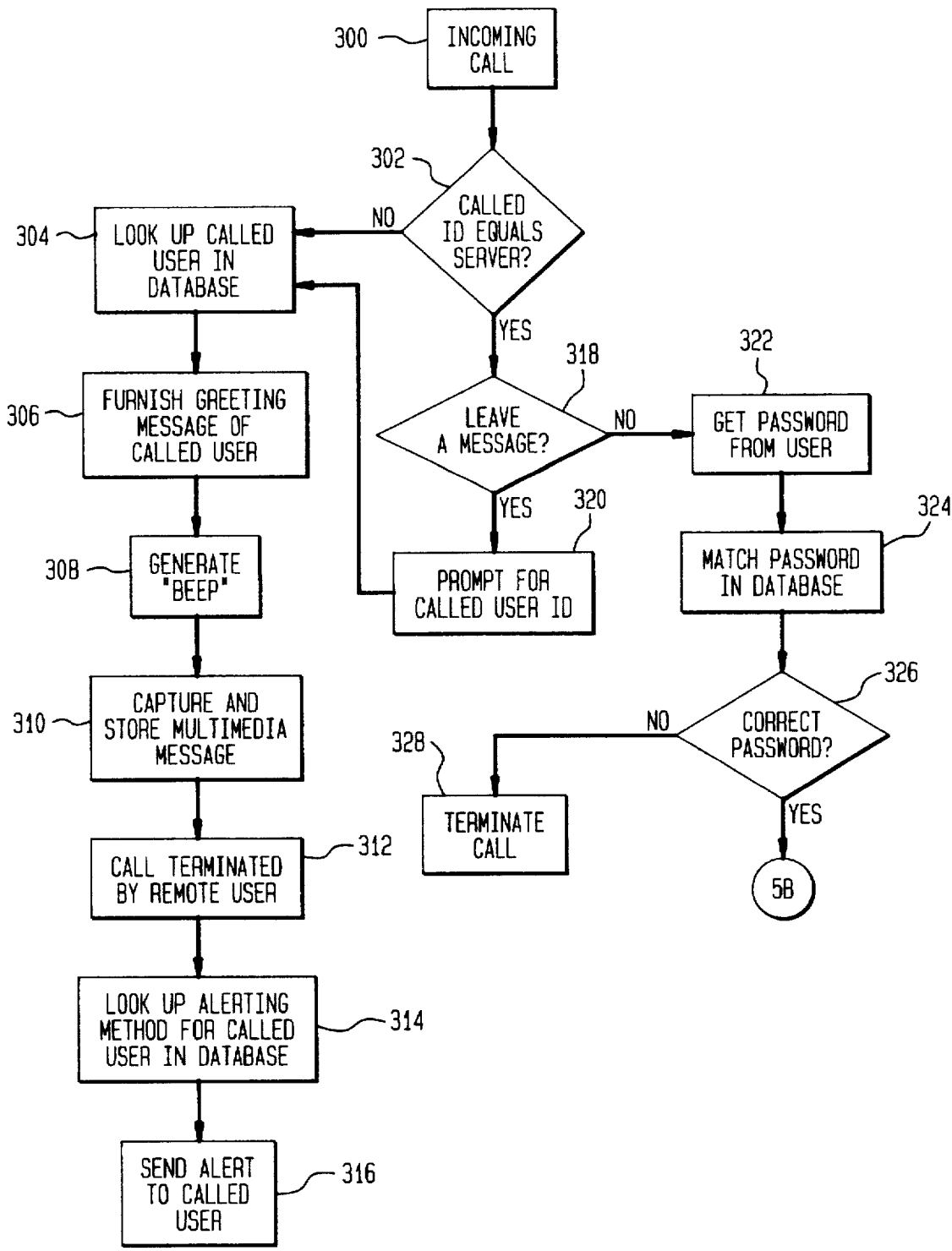
FIGS. 5a and 5b are a flow diagram illustrating the telecommunication network based server call flow in accordance with the teachings of the invention.
Figure 5B:
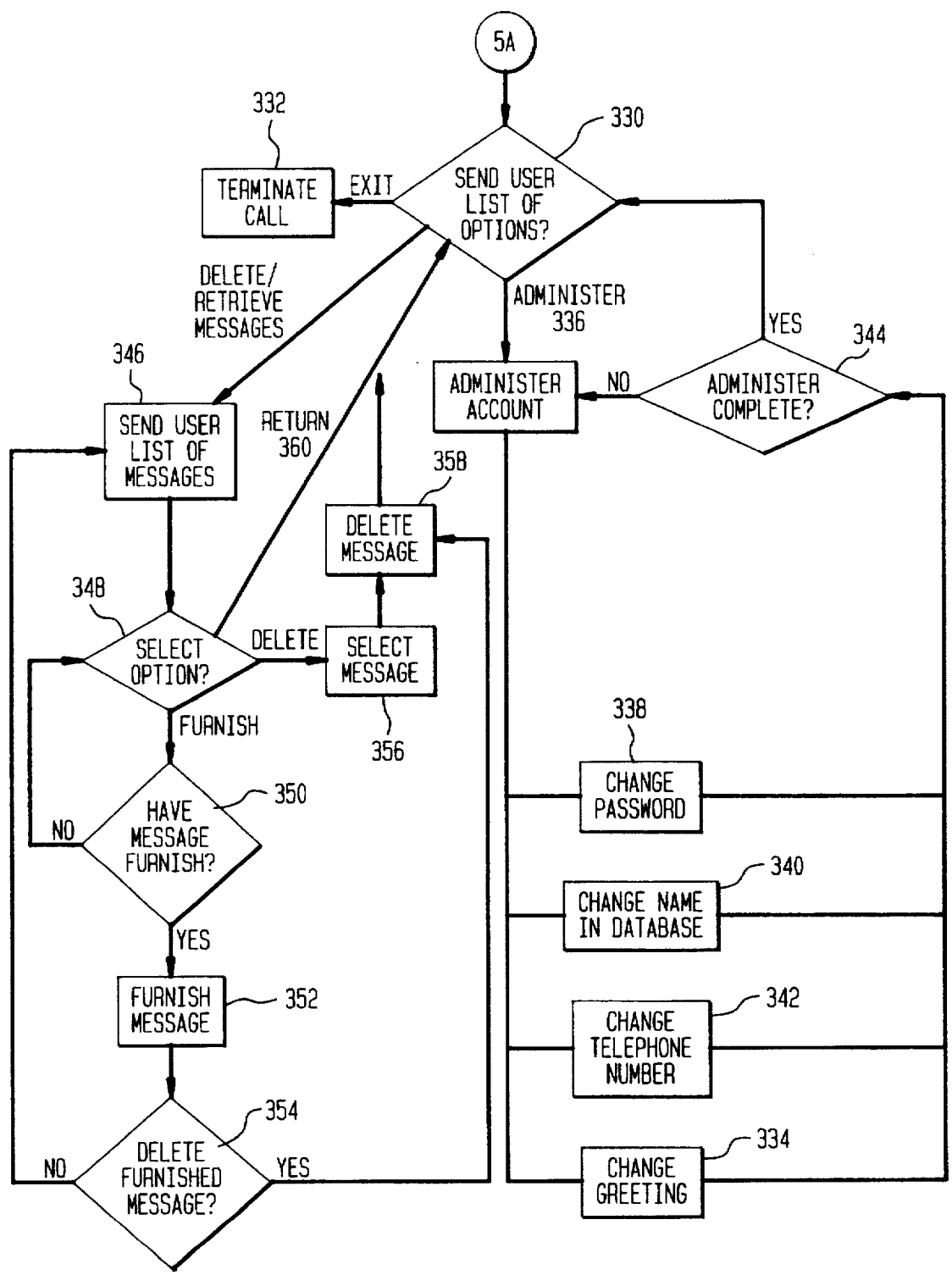

FIGS. 5a and 5b are a flow diagram illustrating the telecommunication network based server call flow for a preferred embodiment of the invention. The server 92 receives the incoming call from the switch 90 (Step 300). The server 92 then checks the CLI for the called number identification to determine if the called number identification was or was not the identification of the server (Step 302). If the called number identification does not correspond to the number identification for the server 92, the call was transferred as a result of a call forward. The server 92 therefore queries a database which contains a list of caller identification numbers for which the server will store multimedia messages and will identify the associated greeting message to be furnished to the caller (Step 304). As discussed above, the greeting message can be one previously recorded by the party associated with the called number or, where no prerecorded multimedia message has been recorded by the party, a standard greeting. Upon identifying the greeting message, the server 92 furnishes the greeting message to the caller (Step 306). At the conclusion of the message, the server will signal the caller to begin leaving a message, for example, with a "Beep" (Step 308). The server will proceed to capture and store the caller's multimedia message (Step 310) in the memory 100. Upon termination of the call by the user (Step 312), the server queries a database for an alerting method associated with the called number identifier (Step 312). The server 314 then initiates alerting the party according to the particular method identified (Step 316).

If the called number identification corresponds to the number identification for the server 92, the call was a direct call. To handle the situation where the caller has called the server to directly leave a message for another party without calling the party, the server 92 provides a message to the caller to identify if the caller wants to leave a message (Step 318). If the response is yes, the caller is prompted for the calling and called parties' telephone numbers (Step 320). The server 92 uses the provided called party number in the called number identifier and proceeds as if the call was switched to the server 92 (Steps 304 to 316). If the caller's response is no, the server 92 prompts the caller for a password (Step 322). The server 92 then queries a database (Step 324) to determine if the password provided by the caller is correct (Step 326) and if it is not, the server terminates the call (Step 328). If the password is correct, the caller is provided with a plurality of options (Step 330). Exemplary options include Exit, Administer, Change Greeting and Delete/Retrieve. "Exit" terminates the call (Step 332). "Administer" (Step 336) allows the caller to perform administrative functions related to the caller's account such as changing their password (Step 338), changing their name in the database (Step 340), for example, from "Robert" to "Bob" or from "Ms. Custis" to "Mrs. Washington", or changing their telephone number (Step 342), for example, for alerting purposes after moving to a new address or change the greeting message (Step 334) furnished to callers. When the party has finished with the administrative functions (Step 344) the party can return to the other options (Step 330). "Delete/Retrieve" prompts the server to furnish messages stored for the caller's identification. When "Retrieve" is selected the caller is provided with a list of stored messages (Step 346) and an option to delete/retrieve/return (Step 348). If the caller selects a message and the delete option (Step 356), the selected message will be deleted by the server 92 from the memory 100 (Step 358). If the caller selects a message and the retrieve option (Step 350), the selected stored message is then furnished to the caller (Step 352). Upon completion of the server's furnishing the message, the caller is then given the option of deleting the message (Step 354). If the caller selects "YES", the message is deleted (Step 358) and the caller is returned to the message list (Step 346). If the caller selects "NO", the message is saved and the caller is again returned to the message list (Step 346). Once the caller has finished retrieving and/or deleting the messages, the caller selects to return to the main option list (Step 360).

It will be recognized that while the invention has been discribed with reference to a network based server, the same functionality may be achieved using a distributed environment in which a community based or local server is connected to one or more network based servers so that the network based server may provide or distribute messages to the community based servers. In a distributed environment, the various functions described herein, for example, messaging, storing, alerting, may be handled by a combination of the community based server and network based server. It will further be recognized that the options provided may originate with the server 92 or reside in software running in the multimedia station 70, 70a, 70b, 70c, 126, or a combination of the two.

It will be further recognized that a plurality of servers may be provided in hierarchical arrangement. In the hierarchical arrangement the called server can either connect the call to another server or alternatively, to direct the switch to do so according to a caller selection or a predetermined instruction. The secondary server would then be used for furnishing a multimedia message which would either be part of the main multimedia message or a completely separate multimedia message. For example, the network server or a primary server could furnish a multimedia message and allow a secondary server to furnish a more detailed message, public service announcement or film. In this way, the furnishing of multimedia messages from a plurality of locations is possible. Furthermore, combinations of prerecorded multimedia messages and live multimedia communications are possible.

Thus, while there have been shown and described and pointed out fundamental novel features of the invention as applied to preferred embodiments thereof, it will be understood that various omissions and substitutions and changes in the form and details of the disclosed system, and in its operation, may be made by those skilled in the art without departing from the spirit of the invention. It is the intention, therefore, to be limited only as indicated by the scope of the claims appended hereto.

We claim:

1. In a circuit switched telecommunication network supporting at least 56 kilobits per second access, a method of handling a multimedia call from a caller using an H.320 protocol compliant multimedia device, comprising the steps of:

attempting to establish a communication connection in the circuit switched telecommunication network between the caller and a recipient for the multimedia call, the multimedia call comprising a unified combination of video and at least one other media communicated according to an H.320 compliant protocol;

determining at a network switch that said communication connection between the caller and said recipient cannot be completed because the multimedia call is an unanswered call;

following said determining step and as a result thereof, connecting said unanswered call to a network based multimedia server; and creating a stored multimedia message in real-time from the caller by recording a multimedia message from the H.320 compliant multimedia device using said network based multimedia server.

2. The method of claim 1 further including the step of furnishing said recipient with said multimedia message.

3. The method of claim 1 wherein following said connecting step the method includes the step of furnishing said caller with a multimedia greeting.

4. The method of claim 1 further including the step of informing the recipient, at a time following said creating step, that said multimedia message was recorded.

5. The method of claim 4 wherein, following said informing step, the method includes the step of furnishing a plurality of options to said recipient.

6. The method of claim 4 wherein said informing step includes the steps of waiting a preselected period of time and initiating a call from said network based multimedia server to said recipient.

7. The method of claim 4 wherein said informing step includes the step of setting a message indicator on telephone equipment associated with said recipient.

8. The method of claim 1 wherein said creating step includes the step of associating a caller identification with said recorded multimedia message.

9. The method of claim 2 wherein the caller is identifiable by a telephone number and said furnishing step includes the step of furnishing said recipient with said telephone number.

10. The method of claim 1 further including the step of associating Calling Line Identification (CLI) information with said recorded multimedia message and storing said CLI information in a memory.

11. The method of claim 10 further including the step of initiating a call from said network based multimedia server to said recipient using said stored CLI information.

12. The method of claim 1, wherein said recorded multimedia message includes an audio portion and said recipient is associated with a device which is capable of only receiving said audio portion, said furnishing step includes the step of furnishing said recipient with only said audio portion.

13. In a circuit switched telecommunication network a system for handling a call from a caller, using a first H.320 protocol compliant multimedia device capable of communicating a unified combination of video and at least one other media using an H.320 compliant protocol, to a recipient associated with a second H.320 protocol compliant multimedia device, the system comprising:

a network based multimedia server;

a first communication path supporting at least 56 kilobits per second access for connecting the caller to said network based multimedia server;

a second communication path supporting at least 56 kilobits per second access for connecting the recipient to said network based multimedia server;

means for generating a signal in the circuit switched telecommunication network, after attempting to establish an H.320 protocol compliant real-time multimedia connection between the caller, using the first H.320 protocol compliant multimedia device, and the recipient, which identifies that said multimedia connection cannot be completed because the recipient is unavailable and for connecting the call to said network based multimedia server in response to said signal over said first communication path;

means for receiving the call and recording, using said network based multimedia server, a multimedia message, comprising a unified combination of video and at least one other media, communicated from the caller according to the H.320 protocol, using the first H.320 protocol compliant multimedia device; and means for furnishing the recipient with said recorded multimedia message over said second communication path.

14. The system of claim 13 further including means for furnishing the caller with a multimedia greeting.

15. The system of claim 13 further including means for informing the recipient, at a time following recording, that said multimedia message was recorded.

16. The system of claim 15 wherein the system further includes means for playing said recorded multimedia message and deleting said recorded multimedia message.

17. The system of claim 14 further including means for initiating a call from said network based multimedia server to the recipient.

18. The system of claim 13 further including means for identifying Calling Line Identification (CLI) information associated with said call.

19. The system of claim 18 further including means for initiating a call from said network based multimedia server to the recipient using said stored CLI information.

20. The system of claim 13 wherein said first communication path supports about 64 kilobits per second access.

21. The system of claim 13 wherein said first communication path supports about 128 kilobits per second access.

22. The system of claim 13 wherein said first communication path supports about 56 kilobits per second access.

23. The system of claim 13 wherein said first communication path supports about 112 kilobits per second access.

24. The system of claim 13 wherein said first communication path supports ISDN PX64 data compression.

25. The system of claim 13 wherein said second communication path supports about 64 kilobits per second access.

26. The system of claim 13 wherein said second communication path supports about 128 kilobits per second access.

27. The system of claim 13 wherein said second communication path supports about 56 kilobits per second access.

28. The system of claim 13 wherein said second communication path supports about 112 kilobits per second access.

29. The system of claim 13 wherein said second communication path supports ISDN PX64 data compression.

30. The system of claim 13 wherein said second communication path includes a switched path.

31. The system of claim 30 wherein said switched path includes one of a T1.5, frame relay access, private line, switched 56, ATM, ISDN BRI, ISDN PRI or nxDS-0 path.

32. The system of claim 13 wherein said second communication path includes a broadcast network.

33. The system of claim 32 wherein said broadcast network includes one of a cable television line or satellite receiver.

34. The system of claim 13 wherein said second communication path includes a modem.

* * * * *